United States Patent [19]

Halfpenny et al.

[11] 4,272,014
[45] Jun. 9, 1981

[54] HUMIDIFICATION SYSTEM

[75] Inventors: Paul F. Halfpenny, Van Nuys; Camillo L. Passarelli, Studio City; Philip S. Starrett, Glendale, all of Calif.

[73] Assignee: Lockheed Corporation, Burbank, Calif.

[21] Appl. No.: 973,745

[22] Filed: Dec. 26, 1978

[51] Int. Cl.³ .............................................. F24F 3/14
[52] U.S. Cl. ................................ 236/44 B; 62/176 C; 261/109
[58] Field of Search ........................ 236/44 B; 165/19; 62/91, 176 C, 171; 261/108–111; 55/257 QV

[56] References Cited

U.S. PATENT DOCUMENTS

| | | | |
|---|---|---|---|
| 2,176,841 | 10/1939 | Hanson | 62/171 |
| 2,218,468 | 10/1940 | Haines | 62/171 X |
| 2,414,718 | 1/1947 | Christensen | 261/111 |
| 2,834,188 | 5/1958 | Bradford | 62/91 |
| 3,105,103 | 9/1963 | Old | 261/111 X |
| 3,200,606 | 8/1965 | Hewett et al. | 62/176 C |
| 3,324,675 | 6/1967 | Mills | 62/507 X |
| 3,547,348 | 12/1970 | Kruper | 165/21 X |
| 3,842,615 | 10/1974 | Reigel et al. | 62/171 |
| 4,042,016 | 8/1977 | Boochever et al. | 62/176 C X |

Primary Examiner—Albert J. Makay
Assistant Examiner—William E. Tapolcai, Jr.
Attorney, Agent, or Firm—Frederic P. Smith

[57] ABSTRACT

An improved humidification system for jet-powered commercial aircraft comprising an evaporator adapted to add moisture to a gas flow, a gas flow control system for applying to the evaporator a gas flow having an internal energy sufficient to vaporize the moisture and a temperature measuring system for measuring the temperature of the gas flow exiting from the evaporator for regulating the amount of moisture added to the gas flow so as to maintain the evaporator exit temperature constant is disclosed. In a particular embodiment, the humidification system consists of a tank having an outlet duct adapted to deliver moisturized air to the passenger compartment of the aircraft, a water injection system adapted to flow water into the tank upon the temperature within the outlet duct rising above a preselected value and to terminate water flow upon the temperature falling below the preselected value, and a gas flow control system coupled to the tank and adapted to control the flow of air into the tank at a rate such that the air has sufficient internal energy to vaporize the water. An evaporator plate system is incorporated within the tank to ensure that all the injected water is vaporized before exiting the tank. Additionally, a demisting filter is mounted between the evaporator plate system and the outlet duct to ensure that all particulate matter is removed from the moisturized air before leaving the tank.

20 Claims, 4 Drawing Figures

HUMIDIFICATION SYSTEM

TECHNICAL FIELD

This invention relates to humidification system and in particular to a system suitable for use on jet-powered aircraft which cruise at high altitudes.

BACKGROUND OF PRIOR ART

Controlling the relative humidity level, whether in an aircraft or in a building, is desirable in order to maintain a comfortable environment for the people within. If the relative humidity in an aircraft is too low, generally below 10%, passengers become uncomfortable due to the occurrence in a long duration flight of, for example, dry, itchy skin, nasal irritation, and gritty eyes. This condition of low relative humidity naturally occurs in modern, jet-engine powered commercial aircraft which typically use bleed air from the engines and/or the auxiliary power unit (APU) as the source of air for pressurization. The bleed air from the various compressor stages of the engines are interconnected by bleed air ducts and control valves and fed to as many as three separate air conditioning systems. The air exiting the air conditioning systems is mixed in a plenum chamber and distributed to the passage compartment by ducting mounted above the passenger compartment. The air circulates through the passenger compartment, down through the below-deck cargo compartment walls and then out flow control valves mounted in the bottom of the fuselage. The use of such a system at altitudes above 25,000 ft., however, reduces the relative humidity in the passenger compartment to a value of about 5-7%, causing the uncomfortable conditions mentioned above.

In order to rectify this condition, moisture must be introduced into the above air conditioning system. While a 50% relative humidity level is considered to be ideal for passenger comfort, levels of 15-30%, still adequate to ensure passenger comfort even on flights as long as 9 to 11 hours, are desirable to reduce the amount of water that must be carried on board the aircraft to raise the humidity, as such additional water adds weight and therefore increases fuel consumption and reduces payload. Additionally, maintaining the relative humidity at between 15-30% reduces the possibility of condensation of moisture on cold surfaces, thus reducing the possibility of corrosion of the aircraft structure, and condensation of moisture on the overhead structure of the passenger compartment, thus reducing the possibility of water droplets forming which can fall on the passengers and crew.

The prior art humidification systems designed for use in aircraft, such as mechanical atomizers or centrifugal "slingers", inject droplets of water into the temperature-conditioned air. These systems do not, however, ensure that the water is completely vaporized. Therefore, water tends to collect on ducting surfaces within the aircraft with the results previously mentioned. If the injection nozzle apparatus of these devices is made small enough to more completely atomize the water, calcium and other mineral deposits rapidly build up and clog the nozzle. They thus must be cleaned often, causing higher maintenance costs. These mineral deposits are also carried into the flight station and electronic bays causing corrosion. While such contamination can be avoided by using distilled water, this increases operating costs and is not practical for commercial aircraft.

Most modern humidification systems, furthermore, as shown, for example, in U.S. Pat. No. 3,642,201, "Humidifier Control", by P. E. Potchen, require humidity level sensors in order to control the humidity level. Airlines are reluctant, however, to install such complicated devices on board their aircraft and prefer open-loop systems.

Accordingly, it is a general object of the present invention to provide a humidification system for humidifying a compartment of an aircraft.

It is another object of the present invention to provide a humidification system for an aircraft that is capable of maintaining a substantially constant level of humidity using a source of air that varies in temperature and pressure, such as bleed air from the engines.

It is a further object of the present invention to provide a humidification system for an aircraft that minimizes the usage of bleed air.

It is another object of the present invention to provide a humidification system that completely vaporizes injected water and is tolerant of mineral deposits so that tap water can be used.

It is still another object of the present invention to provide a humidification system that will control the humidity level within desired limits without the use of a humidity sensor.

SUMMARY OF THE INVENTION

A humidification system suitable for jet-power aircraft is provided. The humidification system comprises an evaporator adapted to add moisture to a gas flow, a gas flow control system for applying to the evaporator a gas flow having an internal energy sufficient to vaporize the moisture and a temperature measuring system for measuring the temperature of the gas flow exiting from the evaporator for regulating the amount of moisture added to the gas flow in order to maintain the temperature at a constant value.

In a particular embodiment, the humidification system consists of a tank having an outlet duct adapted to deliver moisturized air to the air conditioning ducts leading to the passenger compartment, a water injection system, connected to a source of pressurized water, adapted to inject water into the tank when the temperature within the outlet duct of the tank rises above a specific preselected value and to terminate the flow of water upon the temperature falling below the preselected value and a gas flow control system coupled to the tank and adapted to regulate air flow into the tank at a rate such that the air has sufficient internal energy to vaporize the injected water. Additionally, a baffle-type evaporator plate system is incorporated into the tank to ensure that all the moisture is vaporized prior to exiting the evaporator. A demisting filter is also incorporated into the tank to ensure that any particulate matter is retained within the tank.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

DESCRIPTION OF THE PREFERRED EMBODIMENTS

Figure 1:
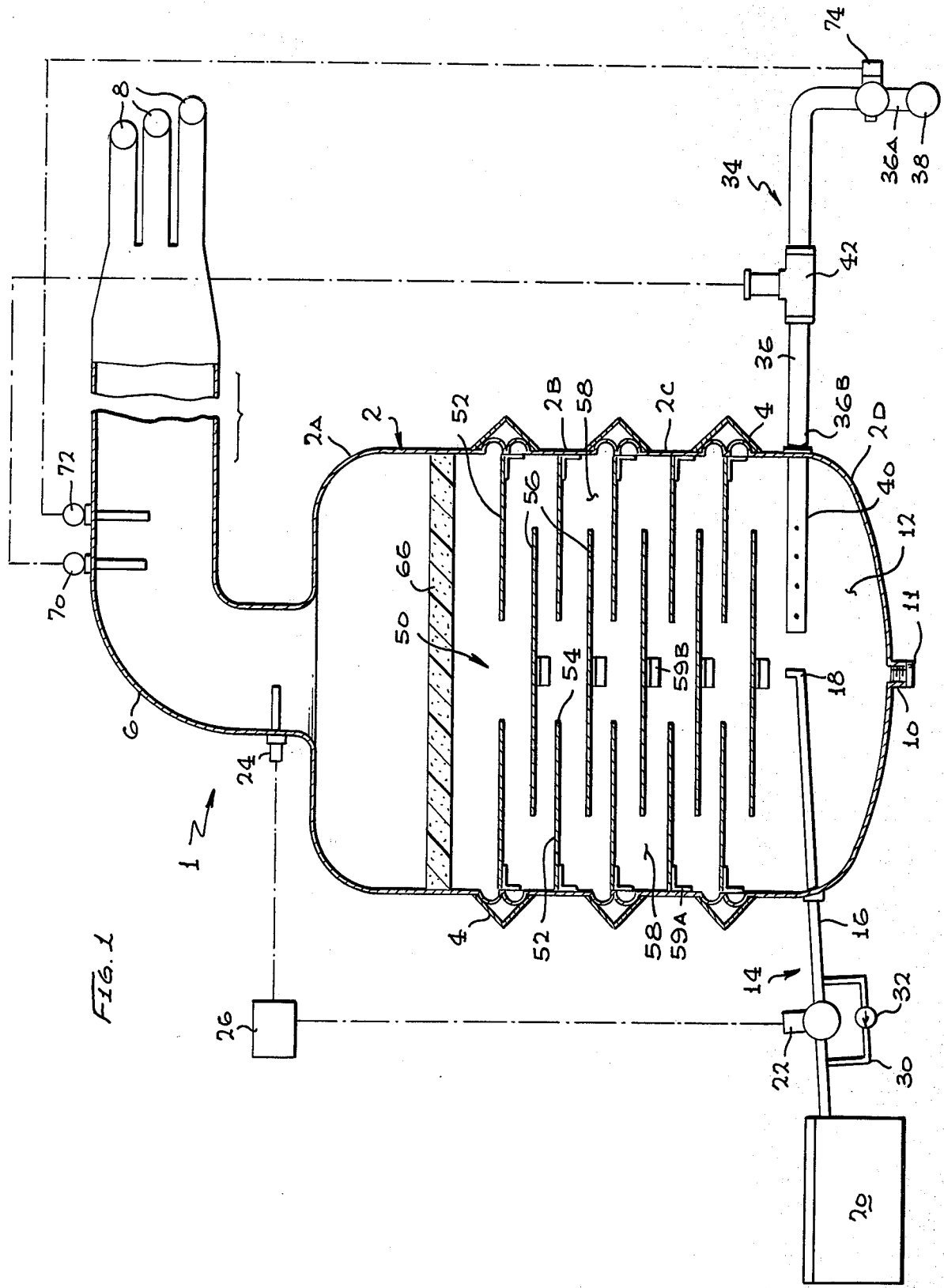
FIG. 1 is a diagrammatic view of a first embodiment of the humidification system.

Referring to the drawings, and in particular to FIG. 1, the humidification system is shown designated by the numeral 1. The system consists of a generally cylindrical, pressurizable tank 2. Although the tank can be of one-piece construction, it is preferably manufactured in sections, designated by numerals 2A, 2B, 2C and 2D, which are joined together by conventional "V" band couplings 4 to provide for easier handling during overhaul and/or repair. At the top of the tank 2 is an outlet duct 6 which connects to the air conditioning ducts 8 which carry fresh, temperature and pressure-regulated air from the air conditioning systems (not shown) and distribute the air throughout the aircraft passenger compartment and flight station. The tank 2 is also provided with a port 10, sealed by a plug 11, located at the bottom of tank section 2D to provide for the drainage of any accumulated water in the interior 12 of the tank 2 prior to dismantling.

A water injection system, designated by numeral 14, is coupled to the tank 2. The system 14 consists of a pipe 16 which extends into the interior 12 of the tank 2 and terminates in a water injection nozzle 18 located near the bottom of the tank 2. The pipe 16 is connected at its opposite end to a source of pressurized water, such as water reservoir 20. Typically, the drinking water reservoir of the aircraft, which is pneumatically pressurized, is used for the water reservoir 20. Alternatively, a separate pressurized tank, or an unpressurized tank with a suitable water pump, could be used as an adequate source. Of these three systems, it is preferable to utilize the drinking water reservoir since such a use requires a slight enlargement of the reservoir, reduces complexity of installation of the humidification system 1 and keeps the overall increase in weight of the aircraft to a minimum.

To control the flow of water into the tank 2, a solenoid operated valve 22 is installed in the pipe 16 between the reservoir 20 and the tank 2. The valve 22 is controlled, as explained below, to open and allow water to flow into the tank 2 when the temperature in the outlet duct 6 rises above a preselected value and to close when the temperature falls below the preselected value. For example, on a 250 passenger airbus type aircraft when the passenger compartment is maintained between 70°–80° F., a preselected temperature in the outlet duct 6 of around 155° F. would be used. This preselected temperature determines the desired degree of humidity maintained in the passenger compartment since a higher temperature level in the duct 6 would cause less water to be injected into the tank 6 and thus lower the humidity level in the passenger compartment while a lower temperature level in the duct 6 would cause more water to be injected into the tank 6 and thus increase the humidity level in the passenger compartment.

The temperature in the outlet duct 6 is sensed by thermistor 24, such as, for example, model No. 0-109-UUA-3503, manufactured by Omega Engineering Company, Stamford, Connecticut, which, when placed in an electrical circuit, is capable of varying the resistance of the circuit as a function of temperature. A resistance-sensing relay 26 is electrically coupled to the thermistor 24 and the valve 22 to actuate the valve 22. The relay 26 may be a solid-state type, such as, for example, model EP-376 manufactured by the Leach Relay Company, Los Angeles, California.

Thus, when the temperature within the outlet duct 6 rises above the preselected value, the changed resistance level of the thermistor 24 is sensed by the relay 26 which applies electrical power to the valve 22 to cause valve 22 to open and allow water to be injected into the tank 2 via nozzle 18. When the temperature falls below the preselected value, relay 26 cuts off electrical power to the valve 22, causing the valve 22 to close and stop the injection of water into the tank 2. While the thermistor-relay combination has been found to provide the most accurate and repeatable results, a less accurate temperature switch can be mounted in the outlet duct 6 as a substitute for the thermistor 24 and relay 26 if less control of the humidity level within the passenger compartment can be tolerated.

Since it is desirable that the water injection system 14 be self-draining in order to reduce scale buildup and to prevent water from leaking out upon disassembly, settling in the fuselage and possible initiating corrosion, the reservoir 20 is placed at a level below the tank 2 with the pipe 16 slanted at an upward angle. A bypass line 30 is connected at its end to pipe 16 on both the upstream and downstream sides of valve 22. A check valve 32 adapted to allow flow only in the direction toward the reservoir 20 is incorporated in line 30. Thus, when the reservoir 20 is depressurized, water trapped in pipe 16 downstream of the valve 22 will drain into line 30 through check valve 32, back into pipe 16 and into the reservoir 20.

Still referring to FIG. 1, the gas flow control system of the present invention, designated by numeral 34, is illustrated. The gas flow control system 34 includes a duct 36 which is connected at end 36A to one or more of the jet engine compressor bleed air ducts 38 and at end 36B to an air injection nozzle 40 located within the interior 12 of the tank 2 in proximity to the water injection nozzle 18.

While bleed air is the most convenient source of high temperature air on jet-engine powered commercial aircraft and is used for deicing the wings and engine inlets as well as a source for pressurizing and air conditioning for the flight station and passengers' compartment, the simple use of bleed air as the source of air for the humidification system presents problems because the bleed air is taken from the compressor stages of the engine and thus the pressure and temperature levels of the bleed air will vary with the power settings of the engine and the altitude of the aircraft. For example, bleed air temperatures on an aircraft typically can vary from a low value of 220° F. to a high of 450° F. while bleed air pressures can vary from 10 psi to 40 psi.

Furthermore, while it is desirable that the usage of bleed air be kept at a minimum since any bleed air taken from the engines increases fuel costs, it is important, as stated previously, that there always be a sufficient amount of air flowing into the tank 2 at a sufficient temperature to ensure that the air has sufficient internal energy or enthalpy to evaporate all the injected water to prevent condensation, corrosion and water droplets. However, it is also important to maintain the airflow rate at a minimum in order to minimize passenger compartment temperature changes.

In order to satisfy the above requirements, the gas flow control system 34 also includes a temperature-biased pressure regulator 42 incorporated into the duct 36 between the tank 2 and bleed air ducts 38 to regulate the downstream pressure as a function of upstream temperature so that the value of the weight flow times the temperature of the air exiting the regulator 42 and entering the tank 2 is substantially constant, i.e., the airflow has constant internal energy or enthalpy, and is sufficient to evaporate all the injected water. A suitable temperature-biased pressure regulator is model 2770120 manufactured by the Air and Fuel Division of Parker-Hannifin Corporation, Irvine, California, and is an electrical/pneumatic-type using the bleed air as the control fluid. A suitable alternate temperature-biased regulator is manufactured by Sundstrand Advanced Technology Group, Rockford, Illinois. While the particular temperature and pressure specifications of the regulator are generally fixed in accordance with the requirements of the humidification system, the regulator may be made adjustable to accommodate changes in the requirements of the humidification system. Sources of gas other than bleed air may, of course, be utilized in the above injected system.

Figure 2:
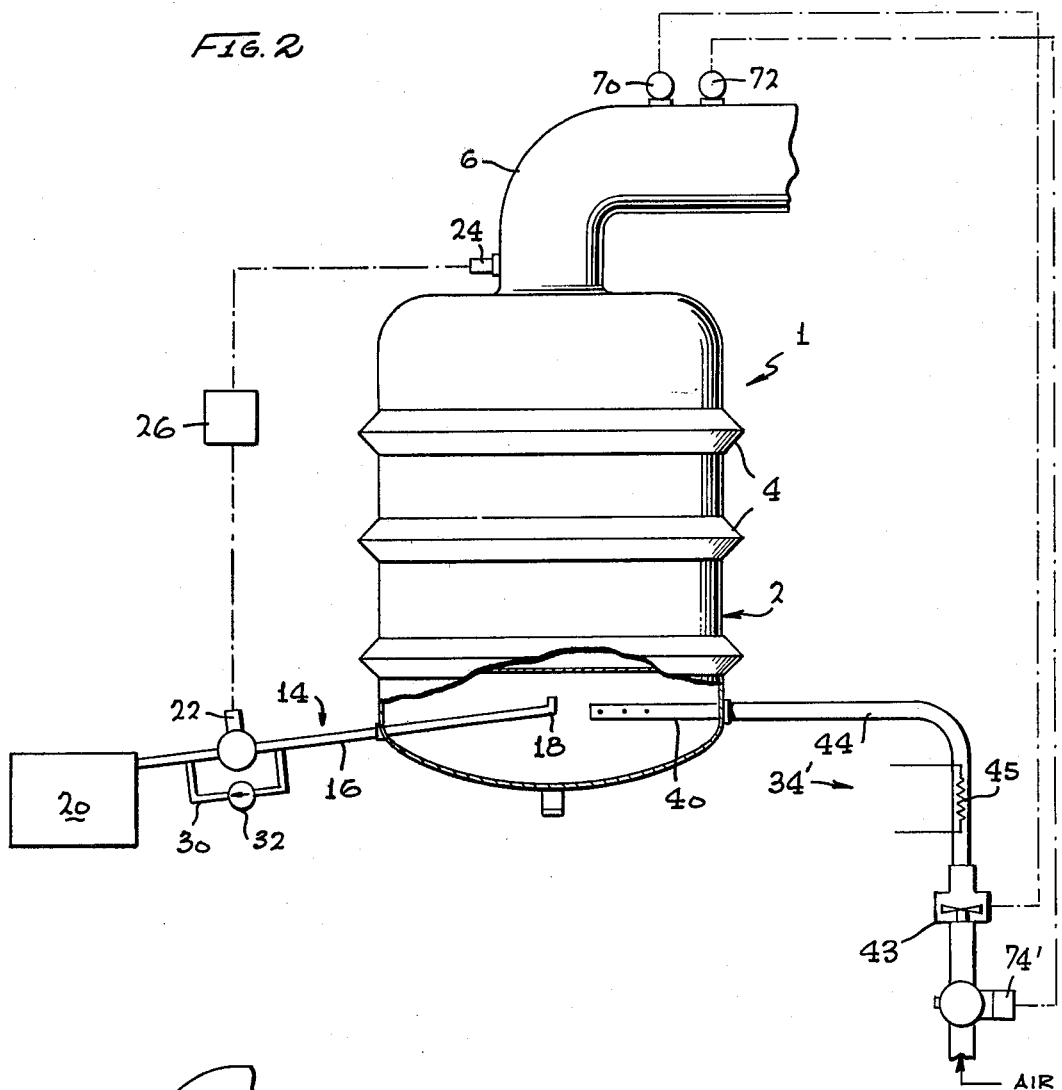
FIG. 2 is a partial diagrammatic view of a second embodiment of the humidification system.

There may be aircraft designs which may not have sufficient bleed air capacity to supply the required airflow to tank 2. In such situations, an alternate gas flow control system 34' shown in FIG. 2 may be used. A compressor 43 is shown having its inlet side connected to a source of air, such as cabin air or air diverted from the air conditioners, and its outlet side connected to tank 2 via duct 44. An electrical heater 45 is installed in the duct 44 between the compressor 43 and the tank 2. Such a gas flow control system 34' would eliminate the need for the regulator 42 because the heater 45 and compressor 43 can be sized or adjusted to supply an airflow with the required internal energy, as specified above.

In order to ensure that all the injected water is evaporated by the ariflow, an evaporator system 50, illustrated in FIG. 1, is incorporated within the tank 2 between the nozzles 18 and 40 and the outlet duct 6 of the tank 2 to ensure that all the water passes through the evaporator system 50. The evaporator system 50 consists of a series of plates 52 having substantially centrally located apertures 54 alternating with a series of solid plates 56 which cooperate with the tank wall sections 2B and 2D to form circumferential apertures 58. The plates 52 and 56 are coupled to the tank wall sections 2B and 2D by brackets 59A and 59B. The system 50 ensures evaporation of substantially all the injected water because any water not initially evaporated by mixing with the hot gas flow is deposited uniformly on the plates 52 and 56 by the gas flow and is evaporated off the plates 52 and 56 by the gas flow, which flow also heats the plates 52 and 56 to the temperature of the hot gas. The baffle configuration illustrated which creates a labyrinth of alternating inward and outward radial flow paths has been found to maximize evaporation of the water and provide uniform scale buildup on the plates.

Figure 3:
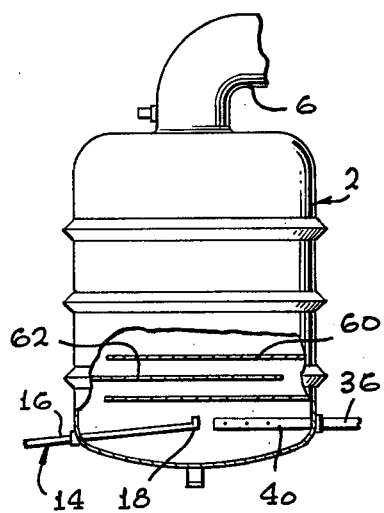
FIG. 3 is a partial diagrammatic view of the tank portion of the humidification system showing an alternate configuration for the evaporator plates.

While stainless steel has been used for the evaporator plate material because of its excellent corrosion resistance, other corrosion-resistant materials would be satisfactory for use in the above configuration. An alternate baffle configuration is shown in FIG. 3 in which the plates 60 and 62 are alternately staggered to the left and right creating a lateral "crisscross" flow path from one side of the tank 2 to the other.

As stated above, if tap water is used in the humidification system, any impurities in the water will tend to deposit as scale on the tank walls and the evaporator plates. Such particular matter as may break off the evaporator plates, or even particles in the water itself, can act as points of condensation for the evaporated water and should be prevented from reaching the outlet duct 6 and the passenger compartment. Therefore, a demisting filter 66, made for example of polyurethane foam, is shown in FIG. 1 mounted between the evaporator system 50 and the outlet duct 6 to trap such particles.

Also shown in FIG. 1 are two safety systems to shut down the humidification system should there be an out-of-tolerance performance or a failure. The first safety system acts to shut off the flow of air to the tank 2 by closing the temperature-biased regulator 42. A normally closed temperature switch 70 is mounted in the outlet duct 6 and is coupled to the circuit (not shonw) which provides electrical power to regulator 42. The switch 70 is set to open should the temperature in the outlet duct 6 reach a temperature level that indicates an out-of-tolerance performance and thereby cut off electrical power to the regulator 42 causing it to close. For example, if the valve 22 is set to open when the temperature within the outlet duct 6 reaches 155° F., the switch 70 would be set to open at 200° F. Upon the temperature dropping below 200° F. due to the lack of airflow, the temperature switch 70 would close and electrical power would again be supplied to the regulator 42 allowing airflow to resume into tank 2. The switch 70 can also be utilized to shut off the compressor 43 in the gas flow control system 34' shown in FIG. 2.

The second safety system consists of a normally open temperature switch 72 mounted in the outlet duct 6 and electrically coupled to a normally open, motor-operated shutoff valve 74 mounted in the duct 6 upstream of the regulator 42. When the temperature in the outlet duct 6 reaches a higher level than that required to initiate regulator shutdown by the switch 70, such as, for example, 250° F. which is indicative of a serious failure, the switch 72 closes and electric power is applied to the valve 74 causing it to close off airflow upstream of the regulator 42. The switch 72 can also be utilized to shut off the valve 74' in the gas flow control system 34' shown in FIG. 2.

In order to determine water and airflow rate requirements and outlet duct temperature settings, one need only know the required flow rate of conditioned air into and out of the passenger compartment, which depends upon the size of the aircraft and the number of passengers that will be carried, the desired temperature to be maintained within the passenger compartment and the existing and desired humidity levels. For example, on a typical 250 passenger wide-bodied aircraft, the required air flow rate necessary to pressurize the passenger compartment and also supply sufficient fresh air is around 220 lbs./min. The temperature within the passenger compartment is normally maintained at a comfortable 70°–80° F. As previously discussed, the desired humidity level is 15–30%, while the humidity normally present at a high altitude is 5–7%. From these parameters, a water flow rate of 0.6 lb./min. and a nominal airflow of 19 lb./min. having an enthalpy of 92 BTU/lb. can be routinely derived to completely vaporize the injected water and to have the water flow initiated only when the temperature in the outlet duct reaches approximately 155° F., a temperature which ensures that there will be no condensation within the ducting and the passenger compartment and that only a nominal 1°–2° F. change in passenger compartment temperature will be experienced.

Figure 4:
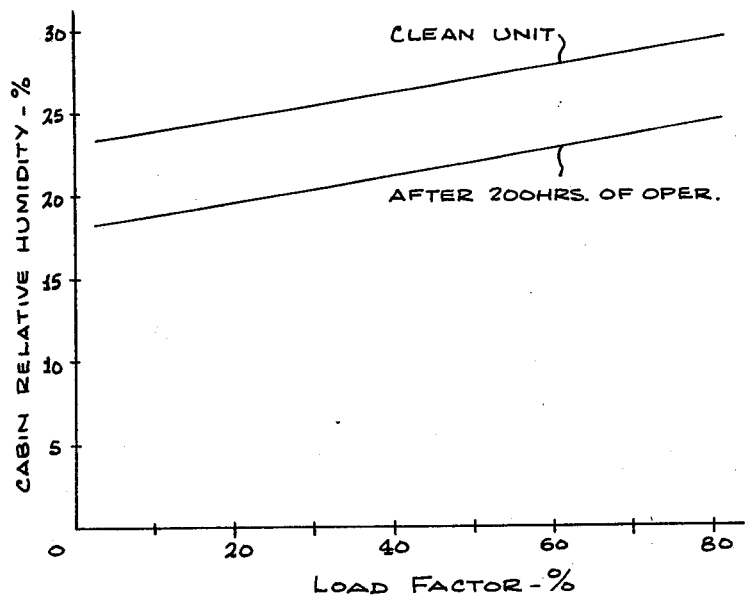
FIG. 4 is a graph displaying the degree of humidity maintained in the passenger compartment of typical 250 passenger wide-body aircraft as a function of passenger load factor.

In FIG. 4, a graph showing the typical humidity level maintained in the passenger compartment of a typical 250 passenger wide-body aircraft at 33,000 ft. is illustrated. Since the passengers themselves add humidity, the humidity level varies as the load factor—the ratio of the number of passengers actually carried to the maximum number of seats available. Because of clogging of the demisting filter and scale buildup within the tank, in particular on the evaporator plates, the humidity level drops with time. As is illustrated in the graph, over 200 hours of satisfactory operation can be obtained before the humidity level within the passenger compartment exceeds tolerances and the humidification system requires cleaning.

While the humidification system has been described with reference to particular embodiments, it should be understood that such embodiments are merely illustrative as there are numerous variations and modifications which may be made by those skilled in the art. Thus, the invention is to be construed as being limited only by the spirit and scope of the appended claims.

INDUSTRIAL APPLICATION

The humidification system is useful on jet-powered commercial aircraft to provide increased passenger comfort.

We claim:

1. A humidification system comprising:
   evaporator means adapted to add moisture to a gas flow;
   means for adding moisture to the evaporator means,
   gas flow control means for applying to said evaporator means a gas flow having a predetermined combination of temperature and flow so as to have an internal energy sufficient to vaporize all of said moisture; and
   temperature measuring means coupled to said moisture adding means for measuring the temperature of the gas flow exiting from said evaporator means and for regulating the amount of moisture added to said gas flow to maintain said temperature at a constant value to produce a desired level of humidity.

2. The system of claim 1 wherein said evaporator means includes:
   a tank having an outlet duct adapted to receive said moisturized gas from said tank; and
   moisture flow control means coupled to a source of moisture and to said temperature measuring means and adapted to deliver said moisture to said tank in accordance with the condition of said temperature measuring means.

3. The system of claim 2 wherein said moisture flow control means comprises:
   pipe means coupled to said source of moisture and to said tank; and
   valve means coupled to said pipe means and adapted to control the flow of said moisture into said tank.

4. The system of claim 1 wherein said evaporator means includes baffle means adapted to be heated by said gas and to receive uniformly thereon and evaporate thereoff moisture carried by said gas, whereby scale is uniformly distributed over said baffle means.

5. The system of claim 1 wherein said gas flow control means comprises:
   duct means coupled to a source of gas and to said evaporator means; and
   regulator means coupled to said duct means and adapted to regulate said gas flow applied to said evaporator means so that the internal energy of said gas flow is sufficient to vaporize said moisture.

6. The system of claim 5 wherein said regulator means is a temperature-biased pressure regulator.

7. The system of claim 1 wherein said temperature measuring means comprises:
   a thermistor coupled to said evaporator means to sense said temperature of said gas flow exiting from said evaporator means, said thermister having changes in the resistance thereof as a function of changes in said temperature; and
   relay means coupled to said thermister and said evaporator means and adapted to sense said changes in the resistance of said thermister and to control the addition of said moisture to said gas flow such that said temperature of said gas exiting said evaporator means is maintained at said constant value.

8. The system of claim 1 wherein said evaporator means includes a demisting filter adapted to trap particulate matter in said moisturized gas prior to said moisturized gas exiting said evaporator means.

9. A system for controlling the humidity within the passenger compartment of an aircraft, said aircraft having a source of high temperature, pressurized air and a source of pressurized water, comprising:
   a tank adapted to receive said air and said water and having an outlet duct coupled to said passenger compartment;
   water injection means coupled to said source of pressurized water and adapted to inject said water into said tank upon the temperature within said outlet duct rising above a preselected value and to terminate said injection of water upon said temperature falling below said preselected value to maintain a desired level of humidity, said water injection means including temperature measuring means adapted to measure the temperature in said outlet duct; and airflow control means coupled to said source of air and adapted to control the flow of said air into said tank at a rate such that said controlled flow of air at said high temperature has an internal energy sufficient to vaporize all of said injected water.

10. The system of claim 9 further including evaporator means mounted within said tank and adapted to maintain said water within said tank until said water has been vaporized.

11. The system of claim 10 wherein said evaporator means comprises baffle means adapted to be heated by said air and to receive uniformly thereon and evaporate thereoff water carried by said air, whereby scale is uniformly distributed over said baffle means.

12. The system of claim 11 wherein said baffle means comprises a first set of evaporator plates having substantially centrally located apertures alternating with a second set of evaporator plates cooperating with the walls of said tank to form circumferential apertures, whereby a labyrinth of alternating inward and outward flow paths is created within said tank.

13. The system of claim 9 wherein said airflow control means comprises:
an air injection nozzle mounted within said tank;
duct means connecting said source of air to said air injection nozzle; and
a temperature-biased pressure regulator mounted in said duct between said source of air and said air injection nozzle for controlling said flow of said air into said tank.

14. The system of claim 9 wherein said water injection means comprises:
a water injection nozzle mounted within said tank;
pipe means connecting said source of pressurized water to said water injection nozzle;
valve means mounted in said pipe means between said source of pressurized water and said injection nozzle;
a thermistor mounted in said outlet duct to sense said temperature within said outlet duct, said thermistor having changes in the resistance thereof as a function of changes in said temperature; and
relay means coupled to said thermistor and said valve means and adapted to sense said changes in the resistance of said thermistor to activate said valve means to an open position upon said temperature within said outlet duct rising above a preselected value and to close said valve means upon said temperature falling below said preselected value.

15. The system of claim 9 wherein the water injection means comprises:
a water injection nozzle mounted within said tank;
a pipe means connecting said source of pressurized water to said water injection nozzle;
valve means mounted in said pipe means between said source of pressurized water and said water injection nozzle; and
a temperature switch mounted in said outlet duct of said tank operably connected to said valve means and adapted to sense said temperature within said outlet duct and to actuate said valve means to the open position upon said temperature within said outlet duct rising above said preselected value and to close said valve means upon said temperature falling below said preselected value.

16. A system for controlling the humidity within the passenger compartment of an aircraft, the aircraft having a source of high temperature, pressurized air and a source of pressurized water, comprising:
a tank having an outlet duct connected to said passenger compartment of said aircraft;
water injection means comprising:
a water injection nozzle mounted within said tank;
pipe means connecting said source of pressurized water to said water injection nozzle; and
valve means mounted in said pipe means between said water injection nozzle and said the source of pressurized water;
a thermistor mounted in said outlet duct of said tank and adapted to sense the temperature within said outlet duct and to have a change in resistance as a function of said temperature;
relay means coupled to said thermistor and said valve means and adapted to sense the change in resistance of said thermistor and to actuate said valve means to the open position upon said temperature within said outlet duct rising above a preselected value and to close said valve means upon said temperature falling below said preselected value;
airflow control means comprising:
an air injection nozzle mounted within said tank;
pipe means connecting said source of high temperature air to said air injection nozzle;
a temperature-biased pressure regulator for controlling airflow into said tank such that said airflow has an internal energy sufficient to vaporize said water injected into said tank;
evaporator means mounted within said tank between said outlet duct and said air injection and said water injection nozzles, said evaporator means adapted to maintain said water within said tank until said water has been vaporized; and
a demisting filter mounted in said tank between said evaporator means and said outlet duct, said filter adapted to prevent particulate matter from leaving said tank.

17. A system for controlling the humidity within the passenger compartment of an aircraft, the aircraft having a source of pressurized water and a source of air, comprising:
a tank having an outlet duct connected to said passenger compartment of said aircraft;
water injection means connected to said source of pressurized water and adapted to inject water into said tank upon the temperature within said outlet duct rising above a preselected value and to terminate said injection of water upon said temperature falling below said preselected value to maintain a desired level of humidity, said water injection means including temperature measuring means adapted to measure the temperature in said outlet duct; and
airflow control means comprising:
an air compressor connected to said source of air;
a duct connecting said compressor to said tank; and
heating means mounted in said duct;
said heating means and said compressor cooperating to apply a predetermined airflow at a predetermined temperature to said tank having an internal energy sufficient to vaporize all of said water.

18. The system of claim 17 further comprising evaporator means mounted within said tank and adapted to maintain said water within said tank until said water has been vaporized.

19. The system of claim 9 or 17 further including a demisting filter mounted between the outlet duct of said tank and said evaporator means, said demisting filter adapted to trap particulate matter in said vaporized water.

20. The system of claim 9 or 17 further including airflow shutoff means comprising:
a temperature sensor mounted in said outlet duct and adapted to provide an electrical signal upon said temperature within said outlet duct exceeding said preselected value by a selected amount; and
valve means coupled to said airflow control means and to said temperature sensor and adapted to shut off airflow to said tank upon receipt of said electrical signal.

* * * * *